United States Patent
Muller et al.

(10) Patent No.: US 12,182,719 B2
(45) Date of Patent: Dec. 31, 2024

(54) FIXED, RANDOM, RECURRENT MATRICES FOR INCREASED DIMENSIONALITY IN NEURAL NETWORKS

(71) Applicant: International Business Machines Corporation, Armonk, NY (US)

(72) Inventors: Lorenz K. Muller, Dubendorf (CH); Pascal Stark, Thalwil (CH); Stefan Abel, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 16/940,857

(22) Filed: Jul. 28, 2020

(65) Prior Publication Data

US 2022/0036198 A1  Feb. 3, 2022

(51) Int. Cl.
*G06N 3/088* (2023.01)
*G06N 3/045* (2023.01)
*G06N 3/084* (2023.01)

(52) U.S. Cl.
CPC ............. *G06N 3/088* (2013.01); *G06N 3/045* (2023.01); *G06N 3/084* (2013.01)

(58) Field of Classification Search
CPC .. G06N 3/00; G06N 5/00; G06N 7/00; G06N 10/00; G06N 20/00; G06N 99/00
See application file for complete search history.

(56) References Cited

U.S. PATENT DOCUMENTS

| | | |
|---|---|---|
| 2003/0194124 A1 | 10/2003 | Suzuki et al. |
| 2014/0365949 A1 | 12/2014 | Xia et al. |
| 2016/0140956 A1 | 5/2016 | Yu et al. |
| 2018/0196892 A1 | 7/2018 | Mana et al. |

(Continued)

FOREIGN PATENT DOCUMENTS

KR  20180093970 A  8/2018

OTHER PUBLICATIONS

H. Jaeger, "The "echo state" approach to analysing and training recurrent neural networks-with an erratum note," Bonn, Germany: German National Research Center for Information Technology GMD Technical Report, vol. 148, p. 34, 2001. (Year: 2001).*

(Continued)

*Primary Examiner* — Kakali Chaki
*Assistant Examiner* — Johnathan R Germick
(74) *Attorney, Agent, or Firm* — Yee & Associates, P.C.

(57) ABSTRACT

A method of operating a neural network. The input layer of the network may have n input nodes connected to output nodes via a hidden layer. The hidden layer may include m hidden nodes. The n input nodes may connect to a subset of k nodes of the m hidden nodes via respective synaptic connections, to which training weights are associated, which form an n×k input matrix $W_{in}$, whereas a subset of m−k nodes of the hidden layer are not connected by any node of the input layer. Running the network may include performing a first matrix vector multiplication between the input matrix $W_{in}$ and a vector of values obtained in output of the input nodes and a second matrix vector multiplication between a fixed matrix $W_{rec}$ of fixed weights and a vector of values obtained in output of the m nodes of the hidden layer.

20 Claims, 8 Drawing Sheets

(56) References Cited

U.S. PATENT DOCUMENTS

| | | |
|---|---|---|
| 2018/0329897 A1 | 11/2018 | Kalchbrenner et al. |
| 2019/0057308 A1 | 2/2019 | Cho et al. |
| 2019/0384898 A1 | 12/2019 | Chen et al. |
| 2021/0216760 A1 | 7/2021 | Howell et al. |
| 2022/0406473 A1 | 12/2022 | Arbel et al. |

OTHER PUBLICATIONS

N. Schaetti, M. Salomon and R. Couturier, "Echo State Networks-Based Reservoir Computing for MNIST Handwritten Digits Recognition," 2016 IEEE Intl Conference on Computational Science and Engineering (CSE) and IEEE Intl Conference on Embedded and Ubiquitous Computing (EUC) and (DCABES) 2016 pp. 481-491 (Year: 2016).*

Jochen J. Steil (2007). Online reservoir adaptation by intrinsic plasticity for backpropagation-decorrelation and echo state learning. Neural Networks, 20(3), 353-364. (Year: 2007).*

Naima Chouikhi, Boudour Ammar, Amir Hussain, & Adel M. Alimi (2019). Bi-level multi-objective evolution of a Multi-Layered Echo-State Network Autoencoder for data representations. Neurocomputing, 341, 195-211. (Year: 2019).*

G. Zhang, C. Zhang, Z. Li and W. Zhang, "A New PSOGSA Inspired Convolutional Echo State Network for Long-term Health Status Prediction," 2018 IEEE International Conference on Robotics and Biomimetics (ROBIO), Kuala Lumpur, Malaysia, 2018, pp. 1298-1303, doi: 10.1109/ROBIO.2018.8665099. (Year: 2018).*

Lapedes, A., & Farber, R. (1987). How Neural Nets Work. In Neural Information Processing Systems. American Institute of Physics (Year: 1987).*

M. Cernansky and M. Makula, "Feed-forward echo state networks," Proceedings. 2005 IEEE International Joint Conference on Neural Networks, 2005., Montreal, QC, Canada, 2005, pp. 1479-1482 vol. 3, doi: 10.1109/IJCNN.2005.1556094. (Year: 2005).*

F. Tung and G. Mori, "Deep Neural Network Compression by In-Parallel Pruning-Quantization," in IEEE Transactions on Pattern Analysis and Machine Intelligence, vol. 42, No. 3, pp. 568-579, Mar. 1, 2020, doi: 10.1109/TPAMI.2018.2886192 (Year: 2020).*

Sharat C. Prasad, & Piyush Prasad. (2014). Deep Recurrent Neural Networks for Time Series Prediction. (Year: 2014).*

Ugurlu, U.; Oksuz, I.; Tas, O. Electricity Price Forecasting Using Recurrent Neural Networks. Energies 2018, 11, 1255. https://doi.org/10.3390/en11051255 (Year: 2018).*

Lym, S., Choukse, E., Zangeneh, S., Wen, W., Sanghavi, S., & Erez, M. (2019). Prune Train: fast neural network training by dynamic sparse model reconfiguration. In Proceedings of the International Conference for High Performance Computing, Networking, Storage and Analysis. ACM. (Year: 2019).*

Sachin S. Talathi, & Aniket Vartak. (2016). Improving performance of recurrent neural network with relu nonlinearity. (Year: 2016).*

Kyle Helfrich, & Qiang Ye. (2019). Eigenvalue Normalized Recurrent Neural Networks for Short Term Memory. (Year: 2019).*

Breiman, Leo, "Bagging Predictors", Machine Learning vol. 24, pp. 123-140 (1996).

Office Action dated Apr. 11, 2024, regarding U.S. Appl. No. 16/940,925, 29 pages.

Sueiras et al., "Offline continuous handwriting recognition using sequence to sequence neural networks", Feb. 7, 2018, Neurocomputing, 289, pp. 119-128. (Year: 2018).

Mell et al., "The NIST Definition of Cloud Computing," Recommendations of the National Institute of Standards and Technology, U.S. Department of Commerce, Special Publication 800-145, Sep. 2011, 7 pages.

Ciortan, "Gentle Introduction to Echo State Networks," Towards Data Science, Mar. 27, 2019, 4 pages https://towardsdatascience.com/gentle-introduction-to-echo-state-networks-af99e5373c68.

Mostafa et al., "Parameter Efficient Training of Deep Convolutional Neural Networks by Dynamic Sparse Reparameterization," Proceedings of the 36th International Conference on Machine Learning, California, 2019, 10 pages, http://proceedings.mlr.press/v97/mostafa19a/mostafa19a.pdf.

Srinivas et al., "Training Sparse Neural Networks," 2017 IEEE Conference on Computer Vision and Pattern Recognition Workshops, Jul. 2017, 8 pages, https://ieeexplore.ieee.org/document/8014795.

Muller et al., "Extracting Sequences From d-Dimensional Input Data for Sequential Processing With Neural Networks," U.S. Appl. No. 16/940,925, filed Jul. 28, 2020.

List of IBM Patents or Patent Applications Treated as Related, Dated Jul. 24, 2020, 2 pages.

Crellin, "Modeling Image Sequences With Particular Application to FMRI Data," Dissertation to Stanford University, Dec. 1996, 161 pages, Copyright 1997 by Neil J. Crellin.

Presti et al., "Two-Dimensional Random Adaptive Sampling for Image Scanning," IEEE Transactions on Geoscience and Remote Sensing, vol. 38, No. 6, Nov. 2000, 10 pages.

Jalalvand et al., "On the Application of Reservoir Computing Networks for Noisy Image Recognition," Elsevier, Nov. 29, 2017, 16 pages.

Mnih et al., "Recurrent Models of Visual Attention," Paper, Printed Jul. 23, 2020, 9 pages.

Jaeger, "Echo state network," Scholarpedia, 2007, 12 pages, doi:10.4249/scholarpedia.2330 http://www.scholarpedia.org/article/Echo_state_network.

Muller et al., "Kernelized Synaptic Weight Matrices," Proceedings of the 35th International Conference on Machine Learning, Sweden, 2018, 10 pages.

Jie Yu et al., "A Review of Network Compression based on Deep Network Pruning," Atlantis Press, Advances in Computer Science Research, 3rd International Conference on Mechatronics Engineering and Information Technology (ICMEIT 2019), 12 pages.

Hinton et al., "Distilling the Knowledge in a Neural Network," arXiv:1503.02531v1, Mar. 9, 2015, 9 pages.

Muller et al., "Neuromorphic Systems Design by Matching Inductive Biases to Hardware Constraints," Frontiers in Neuroscience, Original Research, Published May 28, 2020, 11 pages, doi: 10.3389/fnins.2020.00437.

Rucci et al., "The Unsteady Eye: an Information Processing Stage, not a Bug," Elsevier Ltd., HHS Public Access, Published as Trends Neurosci. Apr. 2015, 28(4): 195-206, doi: 10.1016/j.tins.2015.01.005.

Notice of Allowance dated Sep. 11, 2024, regarding U.S. Appl. No. 16/940,925, 14 pages.

* cited by examiner

FIXED, RANDOM, RECURRENT MATRICES FOR INCREASED DIMENSIONALITY IN NEURAL NETWORKS

This application is a result of a project funded by the Swiss National Science foundation.

BACKGROUND

This disclosure relates in general to computerized techniques of operations of neural networks. In particular, it is directed to methods involving fixed, random, recurrent matrices to increase the dimensionality of neural networks.

Machine learning often relies on artificial neural networks (ANNs), which are computational models inspired by biological neural networks in human or animal brains. Such systems progressively and autonomously learn tasks by way of examples; they have successfully been applied to, e.g., speech recognition, text processing, and computer vision. An ANN typically includes a set of connected units or nodes, which compare to biological neurons in animal brains and are therefore called artificial neurons. Signals are transmitted along connections (also called edges) between artificial neurons, similarly to synapses. That is, an artificial neuron that receives a signal will typically process it and then signals one or more connected neurons. Many types of neural networks are known, starting with feed-forward neural networks, such as multilayer perceptrons, deep neural networks, and convolutional neural networks.

Neural networks are typically implemented in software. However, a neural network may also be implemented in hardware, e.g., as a resistive processing unit or an optical neuromorphic system.

Running neural networks typically requires computing high-dimensional vector-matrix multiplications, be it on inferences or during the training, where entries of the weight matrix of a neural network layer are learned. The large number of learned parameters often results in a costly computational process.

SUMMARY

According to embodiments of the disclosure, a computer-implemented method of operating a neural network is provided. The method first comprises setting a neural network comprising successive layers, which include an input layer, a hidden layer, and an output layer. The input layer has n input nodes connected to output nodes of the output layer via the hidden layer. The hidden layer includes m hidden nodes. The n input nodes connect to a subset of k nodes of the m hidden nodes via respective synaptic connections, to which training weights are associated. The training weights form an n×k input matrix $W_{in}$. A subset of m–k nodes of the hidden layer are not connected by any node of the input layer. Next, the method comprises coupling input data into input nodes of the input layer and running the network. The latter is run by performing at least two matrix vector multiplications. The first operation is a matrix vector multiplication between the input matrix $W_{in}$ and a vector of values obtained in the output of the input nodes, while the second operation is a matrix vector multiplication between a fixed matrix $W_{rec}$ of fixed weights and a vector of values obtained in output of the m nodes of the hidden layer.

The above operations may be performed for inference or training purposes. In embodiments, the input matrix $W_{rec}$ is recurrently applied. Such operations may possibly be performed for each of several hidden layers of the network.

According to embodiments of the disclosure, a computer program product for operating a neural network is provided. The computer program product comprises a computer readable storage medium having program instructions embodied therewith. The program instructions may be executable by a processor, to cause the processor to perform all the operations of the above method.

The above summary is not intended to describe each illustrated embodiment or every implementation of the present disclosure. Computerized methods and computer program products embodying the present disclosure will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIG. 1 depicts fully-connected, hidden layers of a feed-forward network, as used in related art;

FIG. 2 illustrates a network having partly connected, hidden layers in a feed-forward configuration, wherein the hidden layers are configured as recurrent layers, as involved in embodiments;

FIG. 3 shows a complete network configuration, including an input layer connected to an output layer via the hidden layers of FIG. 2, as involved in embodiments;

FIG. 4 illustrates the operation of a single hidden layer, to which a fixed matrix $W_{rec}$ is recurrently applied after having applied an input matrix $W_{in}$ to the input layer, as in embodiments; and FIG. 5 generalizes the operation principle of FIG. 4 to several recurrent hidden layers, as involved in embodiments;

The accompanying drawings show simplified representations of neural networks and computerized devices, as involved in embodiments. Similar or functionally similar elements in the figures have been allocated the same numeral references, unless otherwise indicated.

DETAILED DESCRIPTION

The following description is structured as follows. In the first section, general embodiments and high-level variants are described (sect. 1). The next section addresses technical implementation details (sect. 2). The present method and its variants are collectively referred to as the "present methods." All references Sij refer to operations of the flowcharts of FIGS. 7 and 8, while other references pertain to physical parts or components of the computerized unit of FIG. 7, or to concepts and objects involved in the networks shown in FIGS. 2-5. FIGS. 9A-9B describe cloud aspects of some embodiments.

1. General Embodiments and High-Level Variants

Figure 3:
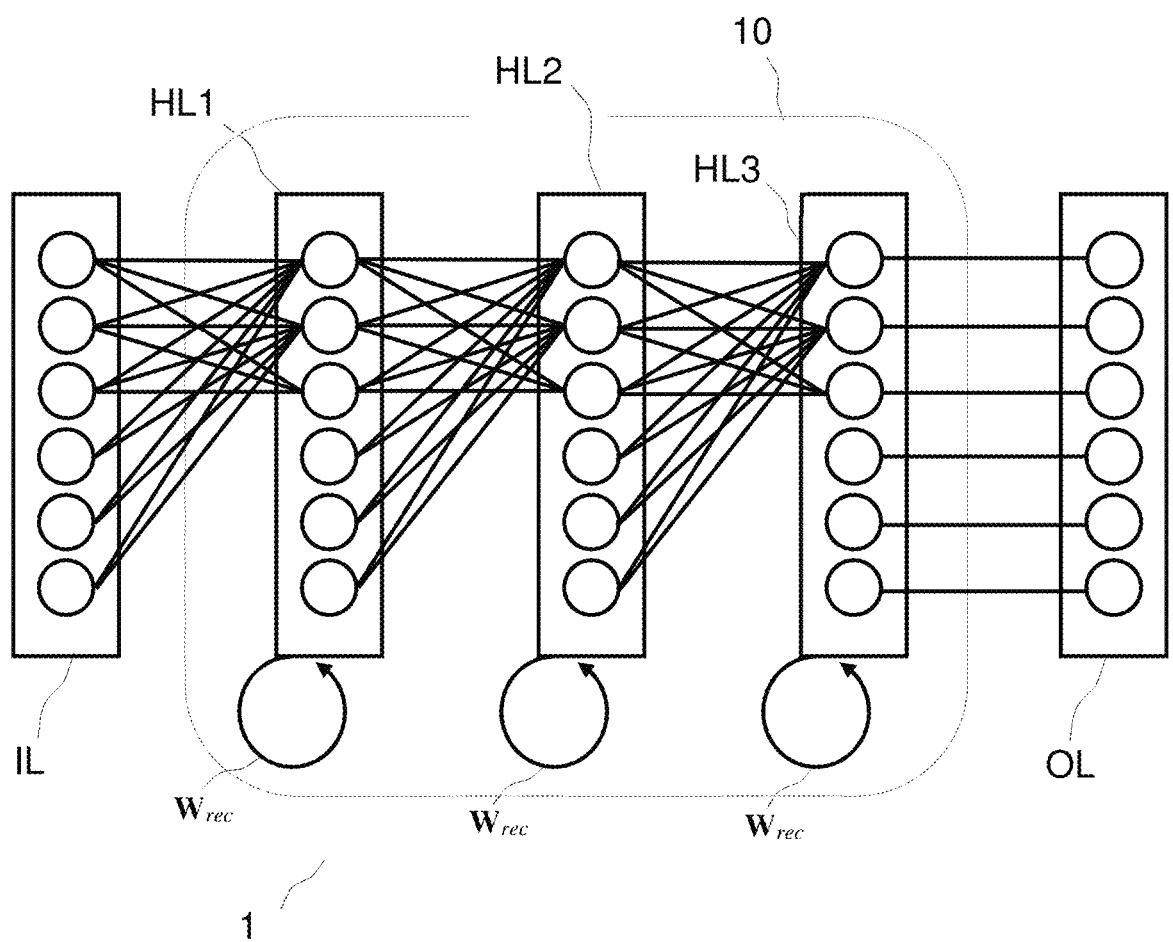
Figure 4:
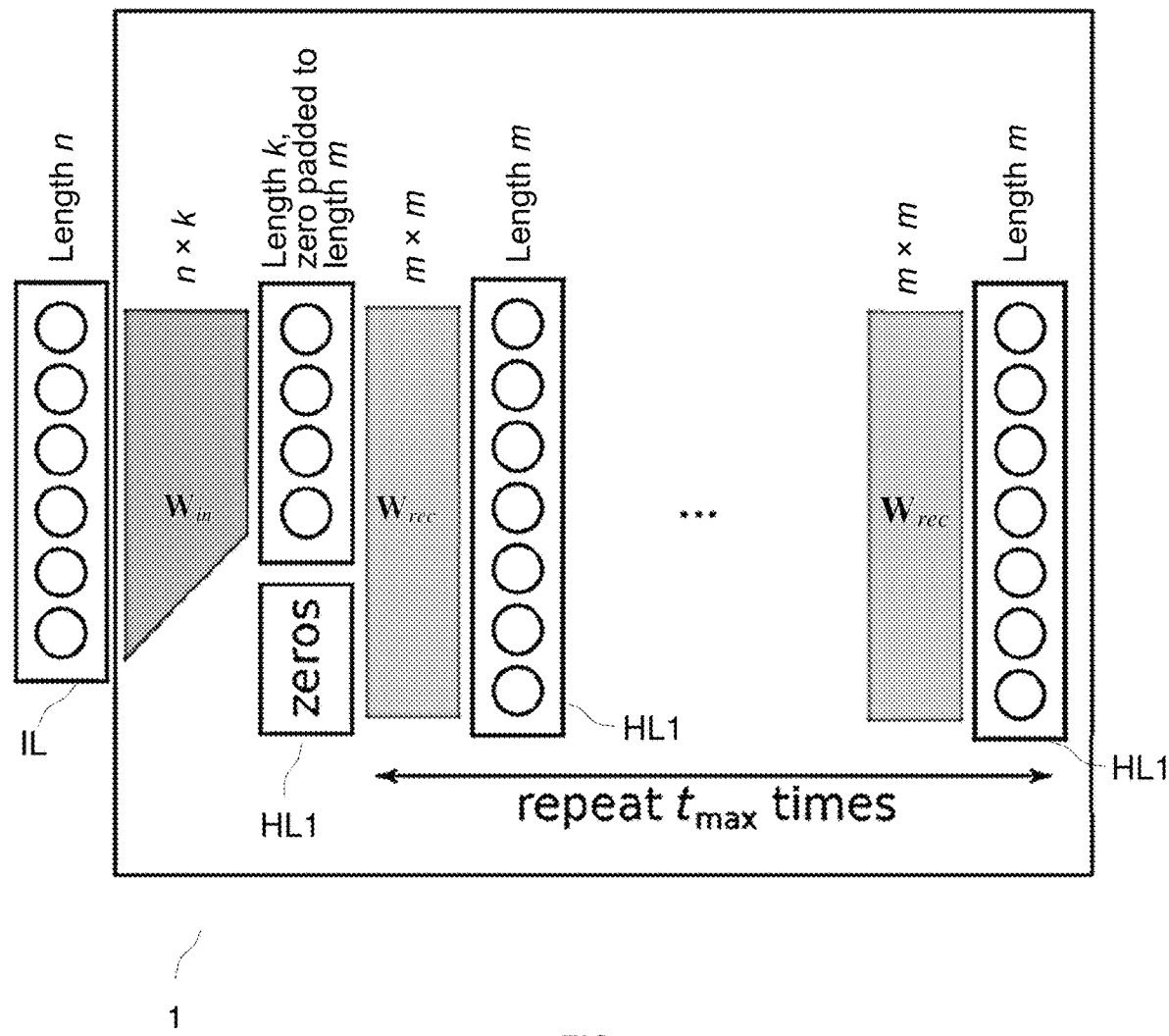
Figure 5:
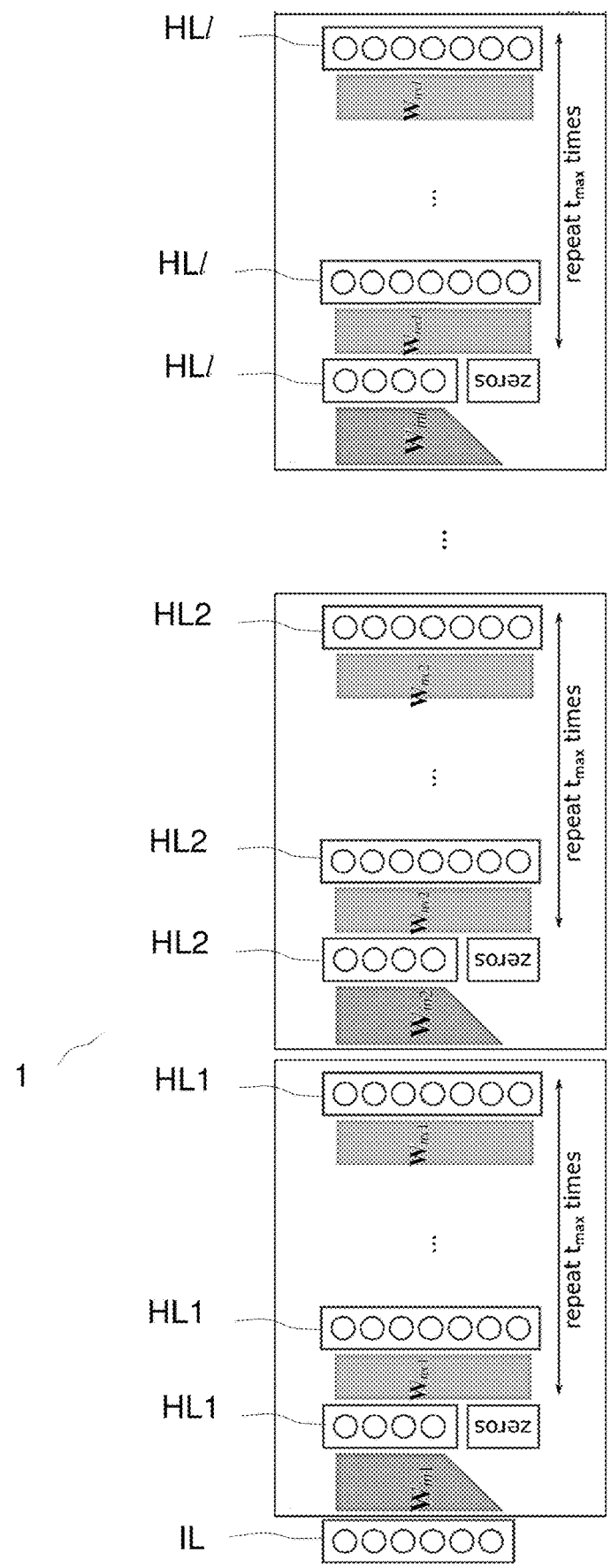
Figure 7:
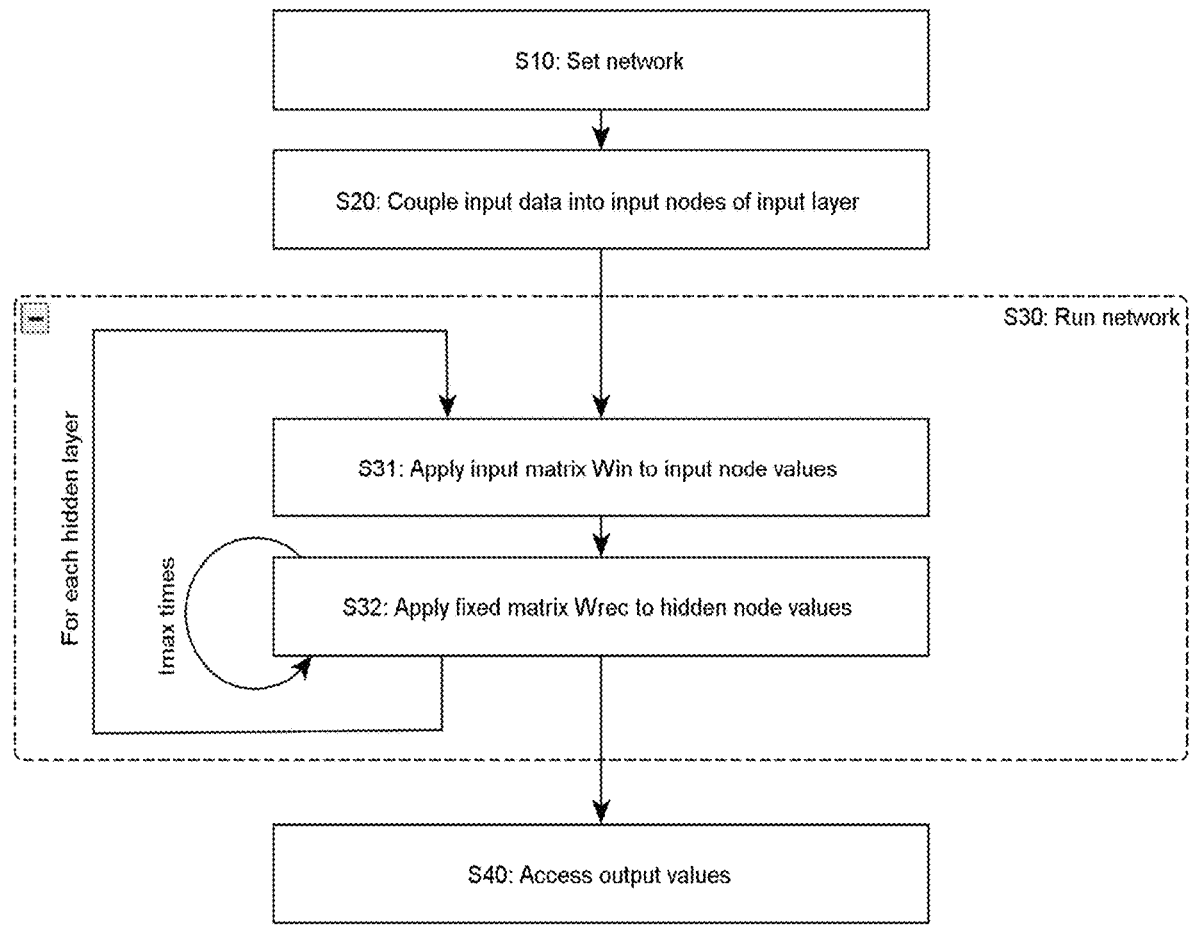
FIG. 7 is a flowchart illustrating high-level operations of a method of operating a network such as depicted in FIGS. 3-5, according to embodiments.

In reference to FIGS. 3, 4, and 7, a first aspect of the disclosure is now described in detail, which concerns a computer-implemented method of operating a neural network 1.

First, this method may require setting S10 a neural network 1, which comprises successive layers IL, HL1, ..., OL. The successive layers may include an input layer IL, a hidden layer HL1, and an output layer OL. The input layer IL may have n input nodes, which may be connected to output nodes of the output layer OL via the hidden layer HL1, see FIG. 3.

Figure 1:
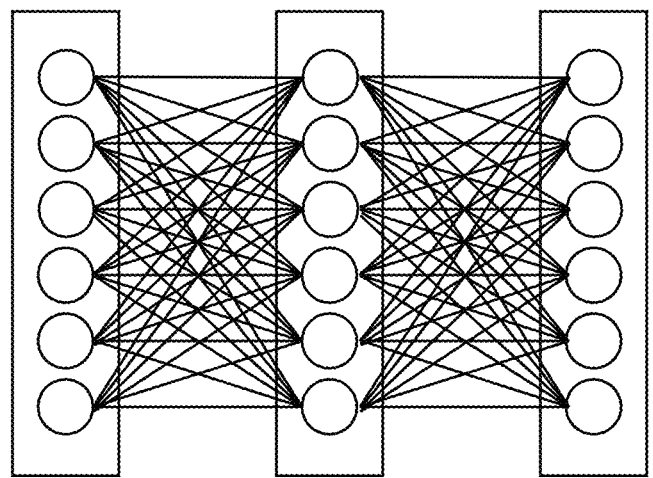
FIGS. 1-5 are block diagrams schematically illustrating neural networks and operations thereof. In detail.
Figure 2:
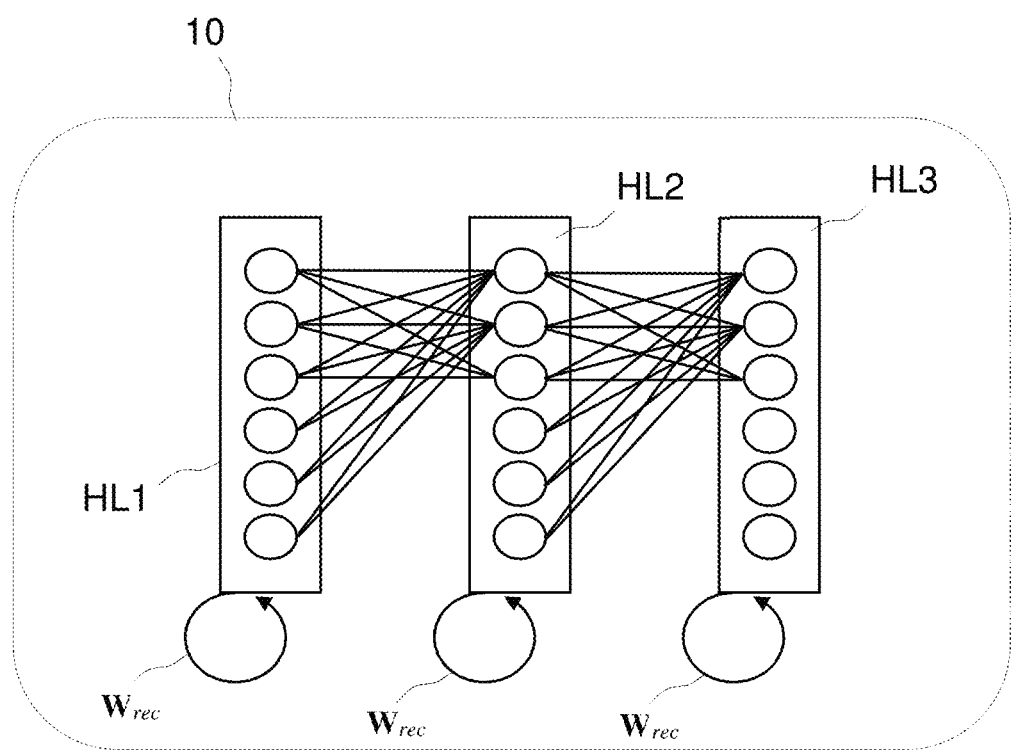

Any number $n \geq 1$ of input nodes may possibly be involved, in principle, this depending on the application at hand and the dimensionality of features extracted from the input data. However, this number is typically larger than or equal to two, in practice. The number of nodes of the output layer OL may depend on the application too and, specifically, on the dimensionality sought for vectors representing the output data. The hidden layer HL1 may include m hidden nodes, where m is strictly larger than n in the present context. The n input nodes may connect only to a subset of k nodes of the m hidden nodes, m>k, via respective synaptic connections, to which training weights are associated. The training weights may form an n×k matrix $W_{in}$, here called the input matrix. Thus, a subset of m−k nodes of the hidden layer HL1 may not be connected by any node of the input layer IL. As the n input nodes only connect to the subset of k nodes of the hidden layer, the sparsity of the hidden layer HL1 may be measured by the parameter s=k/m. Accordingly, the network configuration adopted here may depart from fully connected layers of a network such as shown in FIG. 1.

Next, input data may be coupled S20 into input nodes of the input layer IL, in view of starting computations, i.e., running S30 the network 1. The network operation may involve two types of matrix vector multiplications. The first multiplication may make use of the input matrix $W_{in}$, while the second may involve a m×m matrix $W_{rec}$ of fixed weights i.e., that such weights are fixed means that they remain unchanged, also during the training. The matrix $W_{rec}$ is called the fixed matrix in this document.

In detail, the network may be run S30 by first performing a matrix vector multiplication S31 between the input matrix $W_{in}$ and a vector of values as obtained in output of the input nodes. Next, a second matrix vector multiplication S32 may be performed between the fixed matrix $W_{rec}$ and a vector of values as obtained in output of the m nodes of the hidden layer HL1. In other words, instead of connecting all neurons in the hidden layer HL1 to the previous layer, only a subset of these neurons may be connected to the input layer. Then, a fixed matrix may be applied to the hidden layer.

Owing to the chosen network configuration, the m−k nodes that are not connected to the input nodes (hereafter the "the m−k nodes") may be connected to themselves and, possibly, to some or all of the first k nodes of the hidden layer via the fixed matrix $W_{rec}$, this depending on the actual weight values of the fixed matrix. The fixed matrix W rec may be applied to all of the m nodes of the hidden layer. However, some of the of fixed weights may be set to zero (i.e., the density is less than 1 in that case). In particular, some or all of the weights corresponding to synaptic connections between the subset of m−k nodes and the remaining k nodes may be set to zero.

The above operations may be performed during the training phase, as well as during the inference phase. The training weights of the input matrix $W_{in}$ are weights that can be or have already been learned, due to a suitable given cognitive algorithm. During the inference phase, the training weights used may be the weights as learned during a previous training phase, which is described later in detail.

The approach in these embodiments may cause the system to update outputs from the m−k nodes by multiplying output values of the hidden nodes by the fixed weights, which may effectively result in increasing the dimensionality of the hidden layer, i.e., one first sets some of the feed-forward connections to zero, which may result in a lower-dimensional layer, prior to increasing the dimensionality of the layers by applying the fixed weights. In some embodiments, a subset (at least) of the fixed weights may be randomly drawn, i.e., fixed at random and maintained fixed while running S30 the network. However, some of the fixed weights may be set to zero (e.g., weights connecting the m−k nodes to the complementary k nodes). In variants, the weights connecting the m−k nodes to the complementary k nodes may differ from zero. Thus, applying the fixed matrix $W_{rec}$ may further cause to update outputs from the complementary k nodes. In addition, the fixed weights may be generated so as to fulfil certain properties, e.g., to avoid gradient decay and/or explosion, as discussed later in detail. In addition, the hidden layer may possibly be configured as a recurrent layer. Plus, the network may initially be configured S10 so as to include several hidden layers, each operated as described above with respect to the layer HL1.

Such an approach may make it possible to increase the dimensionality of the hidden layer(s) at little or no additional costs in terms of training. That is, despite the increased dimensionality, usual training operations can be performed, though such operations will aim at updating the sole weights of the input matrix $W_{in}$. What is more, an advantage of fixed weight matrices is that they can be applied recurrently in a very efficient manner. This allows some embodiments to take advantage of specific hardware devices, such as resistive processing units or optical neuromorphic systems, which can efficiently perform such matrix vector operations. Some embodiments may also advantageously be implemented in software, given that a limited number of training parameters are required, while the increased dimensionality achieved through the fixed matrix $W_{rec}$ may result in improved performance, when compared to conventional network architectures. For example, the inventors have observed performance improvements when applying the present approach to the so-called MovieLens-1M dataset. Note, however, that a sparse model may not systematically improve performance in all applications, compared to dense models.

Thus, some embodiments may allow the number of learned parameters to be reduced, while possibly improving performance of the network, at least in some applications. Compared to pruning methods, the present methods rely on fewer connections from the beginning. Compared to network distillation techniques, some embodiments may not initially require training a larger network.

All this is now described in detail, in reference to particular embodiments of the disclosure. To start with, the hidden layer HL1 may be configured as a recurrent layer. That is, the fixed matrix $W_{rec}$ may possibly be repeatedly applied to the m nodes of the hidden layer, so as to successively update outputs from the hidden nodes. More precisely, several matrix vector multiplications S32 may be performed after operation S31, between the fixed matrix $W_{rec}$ and a vector of values as obtained, each time, in output of the m nodes of the hidden layer HL1. Thus, the fixed matrix $W_{rec}$ can be termed a recurrent matrix, or, equivalently, the hidden layer HL1 can be said to be a recurrent layer. Values obtained in output of the hidden layer, after the last $W_{rec}$ iteration, may effectively form the output values. In that case, the hidden layer, in its final state, may play the role of output layer, as assumed in FIG. 4. In variants, a further input matrix may be applied to the hidden layer, as in its final state, to obtain output values.

Recurrently applying the fixed matrix $W_{rec}$ amounts to having several hidden layers connected to one another, as reflected in the depiction of FIG. 4. In terms of training cost, however, only the training cost of approximately a single hidden layer HL1 is incurred.

In embodiments, an activation function $f(.)$ may be applied at each of the hidden nodes. That is, any vector of values as obtained in output of the m nodes of the hidden layer HL1 may correspond to values as outputted by $f(.)$, the arguments of which may depend on signals fed to the hidden nodes, upon applying $W_{in}$ and/or $W_{rec}$. In other words, one increases the dimensionality by multiplying the state-vector of the hidden layer by the fixed matrix $W_{rec}$ and then the activation function may be applied to each node's result. One may possibly repeat such operations several times, and then continue in the feed-forward direction to the next layer, assuming the network is configured as a feed-forward network. As noted earlier, several hidden layers HL1, HL2, . . . , may possibly be involved, each being recurrent and sparse layers, such as layer HL1 described above. In that case, the activation functions $f(.)$ used at each hidden layer may possibly differ from one hidden layer to the other. Moreover, a different activation function may be used after applying the input matrix and after applying the fixed matrix.

One may similarly use an activation function $h(.)$ at the unconnected nodes of the hidden layer. That is, an activation function $h(.)$ may be applied at each of the complementary k nodes, which are connected by the n nodes of the input layer IL through the input matrix $W_{in}$. Thus, values obtained in output of the k nodes, upon applying the input matrix $W_{in}$, may be values as outputted by the activation function $h(.)$. However, activation functions may, in principle, be omitted, the input and weight values permitting.

In FIG. 4, the output values correspond to values as obtained after the last $W_{rec}$ iteration. Updates to outputs from the hidden nodes may be obtained as operations S32 nested in the normal layer operations S31 (compare nested loops S31 and S32 in FIG. 7). So, two "times" can be distinguished: the normal time, whereby $W_{in}$ may be applied at each iteration of the normal time, and the internal update time, during which each hidden layer may be updated by iteratively applying $W_{rec}$. Given input data x, the output values y obtained from the output nodes after having applied the fixed matrix t times can be formulaically written as $y_t = f(y_0^* + W_{rec} y_{t-1})$, where $y_0 = h(W_{in} x)$ and $1 \le t \le t_{max}$. The variable t denotes the internal time (the inner loop S32 in FIG. 7). The vector $y_0^*$ may be obtained by zero-padding $y_0$ from its $k^{th}$ vector element to its $m^{th}$ vector element. While the hidden layers are updated, the input $y_0$ may be kept fixed. The parameter $t_{max}$ may correspond to the maximal number of times that $W_{rec}$ is applied. $t_{max}$ may possibly be strictly larger than 1. However, it may already be sufficient to apply the fixed matrix one time only ($t_{max}=1$), in applications. Applying the fixed matrix more than once may not systematically improve performance. In general, a few iterations suffice, i.e., $t_{max}$ can be kept small, e.g., $t_{max} \le 5$. In variants, no activation function is used, or, equivalently, each of $f(.)$ and $h(.)$ is equal to the identity function (i.e., h(x)=x) in the above equations.

FIGS. 2, 3, 5, and 7 assume several hidden layers, each configured as a sparse, recurrent layer. That is, the successive layers IL, HL1, HL2, . . . , HLl, OL of the network 1 may comprise several hidden layers HL1, HL2, . . . , HLl, each configured as layer HL1 described above. Thus, the input nodes may be connected to the output nodes via the several, successively connected layers HL1, HL2, . . . , HLl. And as before earlier, the network 1 is basically run S30 by performing two types of matrix vector multiplication for each of the hidden layers HL1, HL2, . . . , HLl. The first matrix vector multiplication S31 may involve an input matrix $W_{in1}$, $W_{in2}$, etc. At any hidden layer, after having applied the relevant input matrix, a fixed matrix may be applied, possibly several times. I.e., one or more matrix vector multiplications S32 may thus be performed, using a fixed matrix $W_{rec1}$, $W_{rec2}$, etc. The matrices $W_{in1}$, $W_{in2}$, . . . and $W_{rec1}$, $W_{rec2}$, . . . respectively pertain to hidden layers HL1, HL2, . . . . Each matrix may be multiplied by a vector of values as obtained in the output of a set of corresponding nodes. As implicit from the above notations and as assumed in FIG. 5, each hidden layer may possibly be assigned a respective fixed matrix $W_{rec1}$, $W_{rec2}$, . . . , where such matrices differ from one hidden layer to the other. The number of times the respective fixed matrices are applied may possibly vary from one hidden layer to the other. In variants, the parameter $t_{max}$ is the same for each hidden layer, as assumed in FIG. 5. In addition, the training may give rise to distinct matrices $W_{in1}$, $W_{in2}$, . . . for each hidden layer. In variants, a same fixed matrix $W_{rec}$ may be used for each hidden layer. And as evoked earlier, distinct activation functions may possibly be used at each of the hidden layers and the activation functions used after applying $W_{in1}$, $W_{in2}$, . . . may possibly differ from activations used after applying $W_{rec1}$, $W_{rec2}$ . . . .

The fixed weights of any of the fixed matrices $W_{rec}$, $W_{rec1}$, $W_{rec2}$, . . . discussed so far may be drawn at random. In fact, at least some of the fixed weights may be drawn at random. This operation may be performed prior to performing S32 the corresponding matrix vector multiplication. It may, for example, be done at operation S10, while setting other parameters of the network. For example, one may set S10 a subset of the fixed weights of one or more of the fixed matrices to zero, while complementary subsets of fixed weights may be drawn at random. In particular, for any of the fixed matrices, weights connecting the hidden nodes of a given hidden layer to the k nodes of that same layer may be set to zero, while weights connecting the m−k nodes to themselves in that same layer may be generated so as to differ from zero, though a certain sparsity may be allowed.

Note, the fixed weights may possibly be constrained and the activation functions designed so as for the network 1 to have an echo state property. Enforcing the echo state property allows an easier training as it prevents fast exponential growth of activations (forward) and error terms (backward). To that aim, one may impose the fixed weight matrix to have a spectral radius that is strictly less than 1, even though this is not strictly required to achieve the echo state property. In illustrative embodiments, the echo state property may be achieved by setting S10 the fixed weights so as for a density thereof to be less than 0.3. Then, the weights may be rescaled, so as to have a spectral radius that is strictly less than 1. For example, the recurrent matrix $W_{rec}$ can be set so as to have fixed, uniformly random weights of density 0.2 and it is then rescaled to have a spectral radius of 0.95.

Referring back to FIGS. 2 and 3, the neural network 1 may be set as a feed-forward neural network 1, such as a multilayer perceptron. The operations depicted in the flowchart of FIG. 7 are operations that may be performed both for training and inference purposes. The forward path assumed in FIG. 7 may be used so as to infer S40 output values (i.e., values obtained from the output nodes of the network 1), based on training weights of the input matrix $W_{in}$, as in FIG. 4, or based on training weights of each input matrix $W_{in1}, W_{in2}, \ldots, W_{inl}$, see FIG. 5, as learned during a previous training phase.

Figure 8:
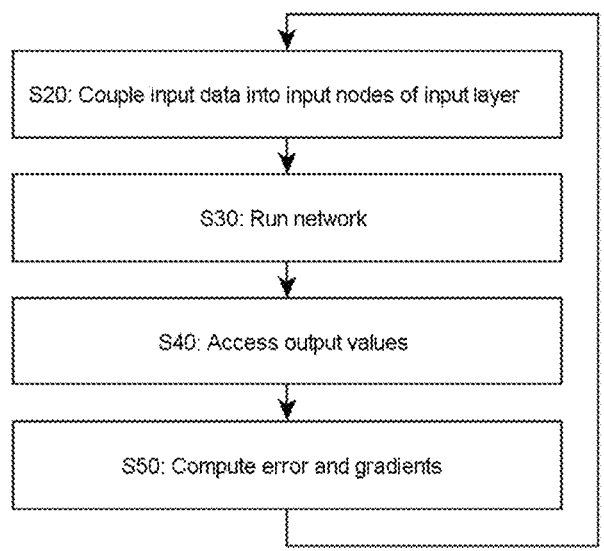
FIG. 8 is a flowchart illustrating how such a network can be trained, based on operations shown in FIG. 7, as in embodiments.
Figure 9A:
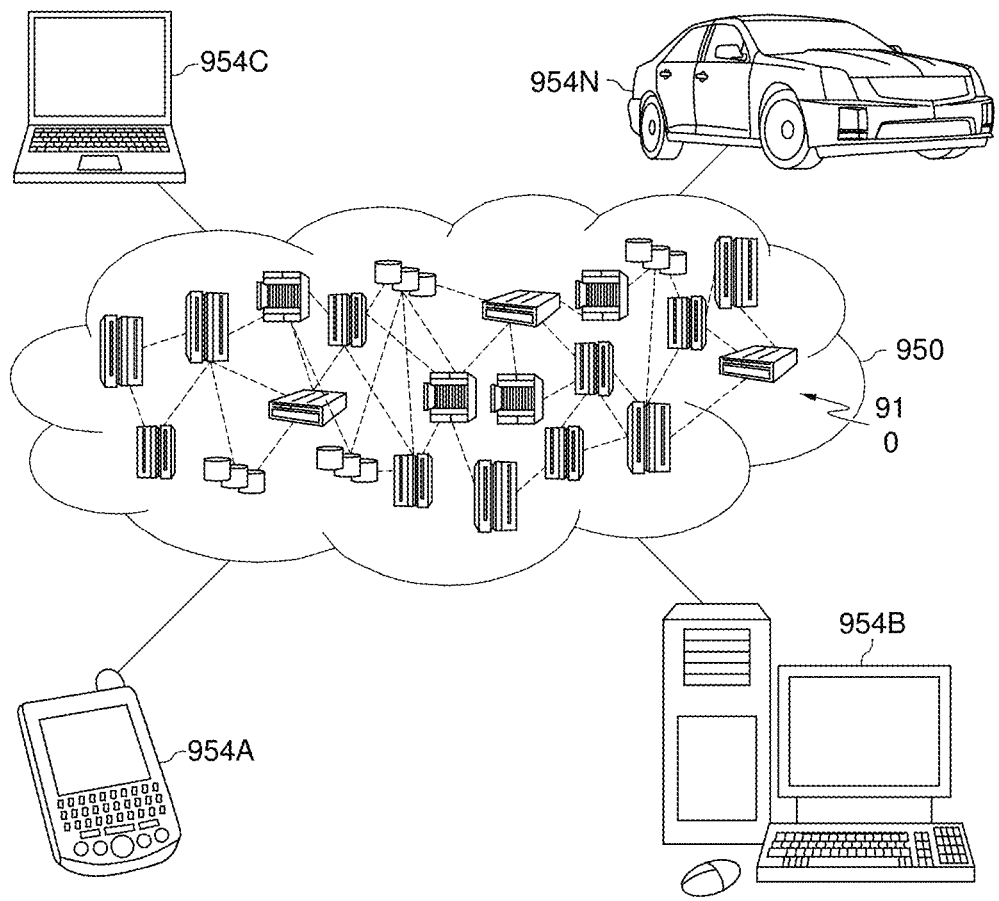
FIG. 9A depicts a cloud computing environment according to an embodiment of the present disclosure.
Figure 9B:
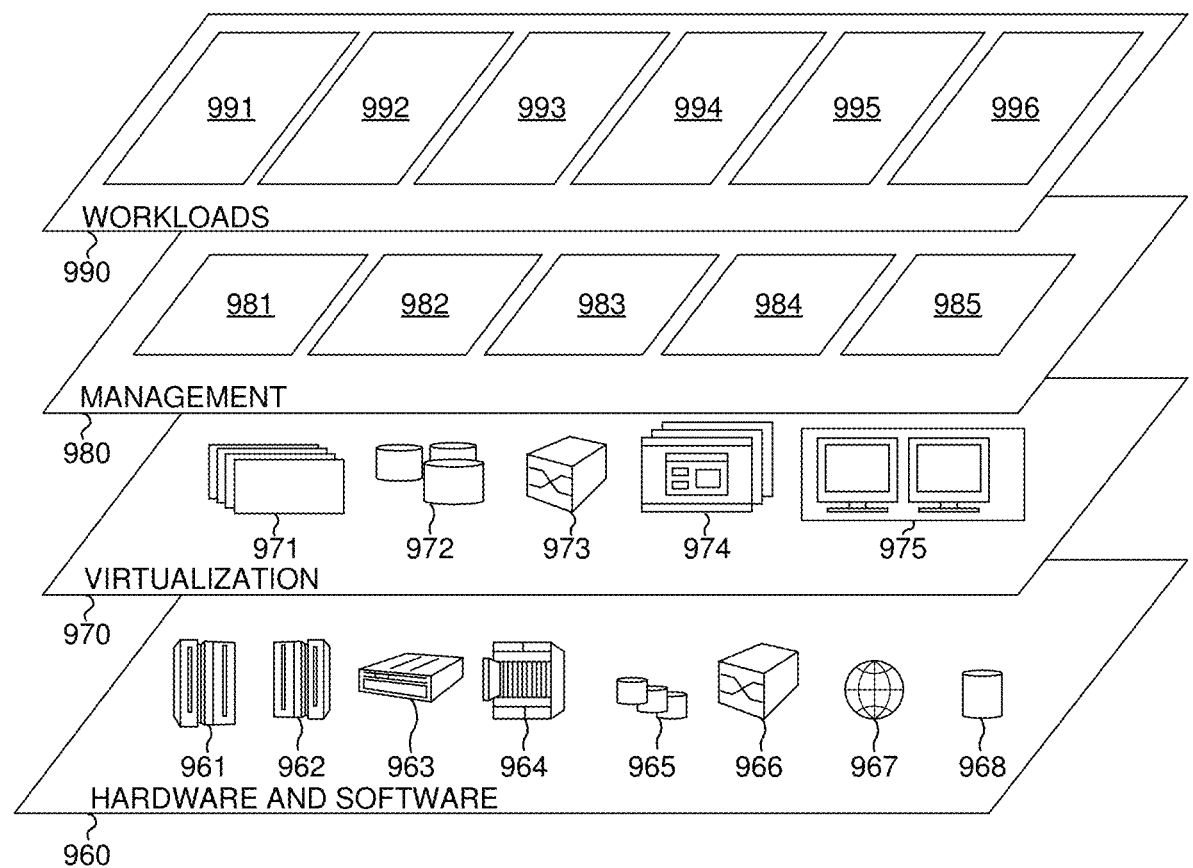
FIG. 9B depicts abstraction model layers according to an embodiment of the present disclosure.

The training phase is schematically illustrated in FIG. 8. In corresponding embodiments, the network 1 may be run S30 so as to train S20-S40 the weights of the input matrix (or input matrices) in a supervised manner, due to a suitable learning algorithm, e.g., a backpropagation algorithm for feed-forward networks. The latter may take into account target output values associated to the output nodes, e.g., corresponding to feature vectors extracted from outputs of a single input-output example. That is, the algorithm may compute the gradient of the loss function with respect to the sole input weights for each single input-output example. Then, it may compute the error function over all the training examples as an average of losses over individual examples, to progressively adjust the input weights and eventually determine optimal input weights.

Back-propagation may be advantageously used through the fixed layers, owing to its low-computational cost, in many physical implementations. In variants to multilayer perceptrons, the neural network 1 may, for example, be set as a convolutional neural network or a recurrent network, which may require some adaptations to standard back-propagation algorithms. In other variants, the network may be set as an autoencoder or as a factorization machine, for example.

Various tests have been done that show improved performance, in which the neural network 1 was set S10 as multilayer perceptron, with various numbers m of hidden nodes, i.e., between 16 and 500. Rectified linear activation functions were used and applied at each of the hidden nodes. Various approaches have been used based on an item-based autoencoder, having one or two hidden layers with m∈{280, 300, 350, 400, 450, 500} neurons each, using a sigmoid activation function. Such a model has shown improved performance for collaborative filtering settings, compared to a fully-connected baseline for a same given number of free parameters.

Various hardware substrates may be contemplated to perform the present methods. For example, a hardware processing device may be used, which include or emulate hardware modules such as described below:

A first general matrix multiplier, in which a vector and a matrix may be fully specified;
A second general matrix multiplier, in which a matrix may be fixed at random;
An activation function block, to compute node output values, which may, however, simply implement the identity function;
A gain block, if necessary; and
An entry-wise matrix adder.

Input data may be fed into first general matrix multiplier, as well as an input matrix. Outputs may be processed by an entry-wise adder and then via the activation function block. The results may then be fed to the second general matrix multiplier, which may take a fixed matrix as input and branches to the gain unit. After t round-trips, a final output y(t) may be obtained.

Figure 6:
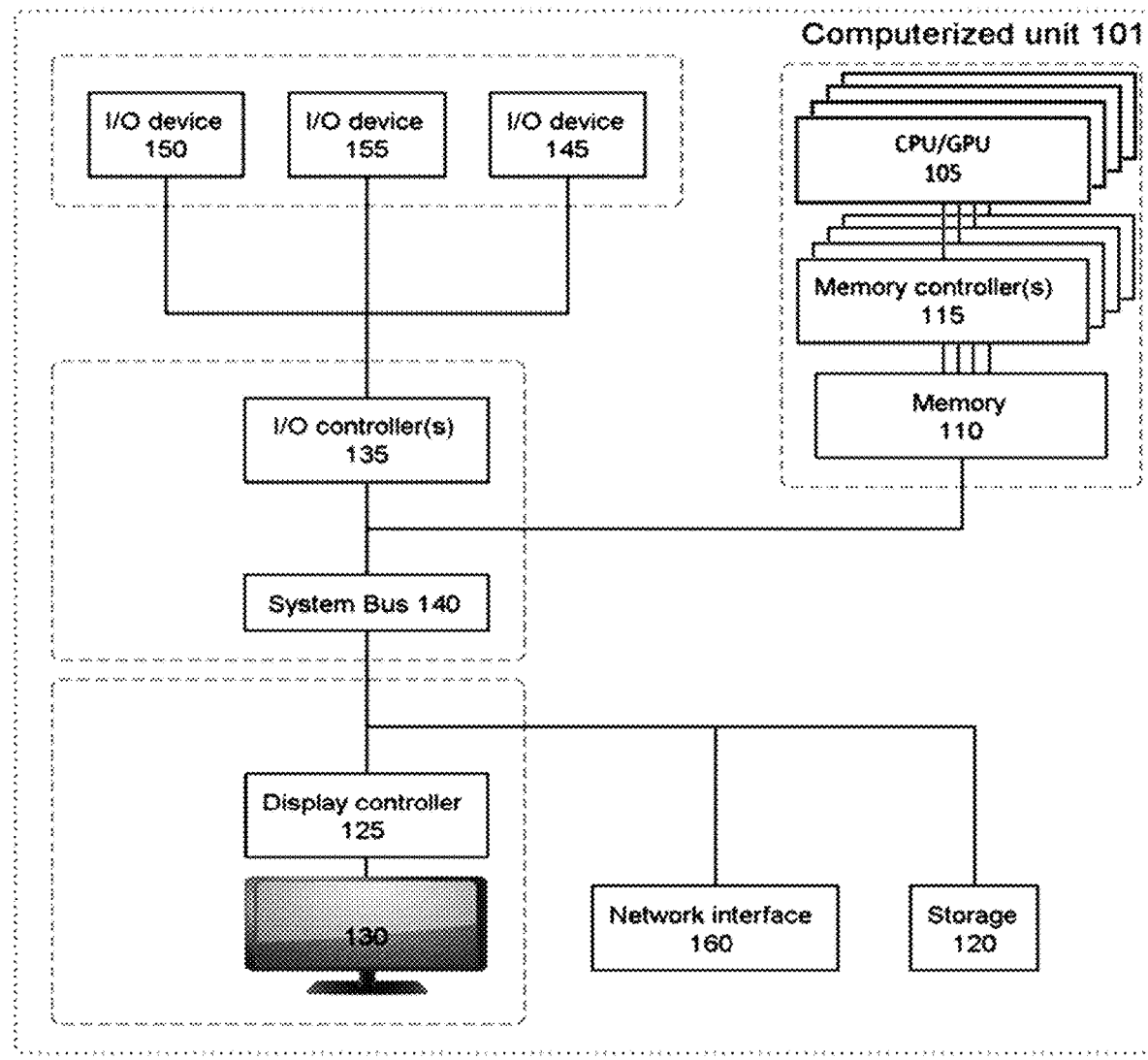
FIG. 6 schematically represents a general-purpose computerized unit, suited for implementing one or more method operations as involved in embodiments of the disclosure.

In variants, however, computations may be performed using a general-purpose computerized unit 101, such as depicted in FIG. 6. Such a unit is described in detail in section 2.1 below.

Next, according to another aspect, some embodiments may be embodied as a computer program product for operating a neural network. The computer program product may comprise a computer readable storage medium having program instructions embodied therewith, wherein the program instructions are executable by a processor, so as to cause the process to perform operations according to methods as described herein. Additional features of this computer program product are described in detail in section 2.2.

2. Technical Implementation Details 2.1 Computerized Systems and Devices

Computerized systems and devices may be suitably designed for implementing embodiments of the present disclosure as described herein. In that respect, it may be appreciated that the methods described herein are largely non-interactive and automated. In some embodiments, the methods described herein can be implemented either in an interactive, a partly-interactive, or a non-interactive system. The methods described herein can be implemented in software, hardware, or a combination thereof. In some embodiments, the methods proposed herein may be implemented in software, as an executable program, the latter executed by suitable digital processing devices. More generally, embodiments of the present disclosure may also be implemented wherein virtual machines and/or general-purpose digital computers, such as personal computers, workstations, etc., are used.

For instance, FIG. 6 schematically represents a computerized unit 101 (e.g., a general- or specific-purpose computer), which may possibly interact with other, similar units, so as to be able to perform operations according to the present methods.

In some embodiments, in terms of hardware architecture, as shown in FIG. 6, each unit 101 may include at least one processor 105, and a memory 110 coupled to a memory controller 115. Several processors (CPUs, and/or GPUs) may possibly be involved in each unit 101. To that aim, each CPU/GPU may be assigned a respective memory controller.

One or more input and/or output (I/O) devices 145, 150, 155 (or peripherals) may be communicatively coupled via a local input/output controller 135. The input/output controller 135 may be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 may be hardware devices for executing software instructions. The processors 105 may be any custom made or commercially available processor(s). In general, they may involve any type of semiconductor-based microprocessor (in the form of a microchip or chip set), or more generally, any device for executing software instructions.

The memory 110 typically includes volatile memory elements (e.g., random-access memory), and may further include nonvolatile memory elements. Moreover, the memory 110 may incorporate electronic, magnetic, optical, and/or other types of storage media.

Software in memory 110 may include one or more separate programs, each of which comprises executable instructions for implementing logical functions. In the example of FIG. 6, instructions loaded in the memory 110 may include instructions arising from the execution of the computerized methods described herein in accordance with some embodiments. The memory 110 may further load a suitable operating system (OS) 111. The OS 111 may control the execution of other computer programs or instructions and provides scheduling, input-output control, file and data management, memory management, and communication control and related services.

Possibly, a conventional keyboard and mouse may be coupled to the input/output controller 135. Other I/O devices 140-155 may be included. The computerized unit 101 may further include a display controller 125 coupled to a display 130. The computerized unit 101 may also include a network interface or transceiver 160 for coupling to a network, to enable, in turn, data communication to/from other, external components, e.g., other units 101.

The network may transmit and receive data between a given unit 101 and other devices 101. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Typically, this network allows very fast message passing between the units.

The network may also be an IP-based network for communication between any given unit 101 and any external unit, via a broadband connection. In some embodiments, network can be a managed IP network administered by a service provider. Additionally, the network can be a packet-switched network such as a LAN, WAN, Internet network, an Internet of things network, etc.

2.2 Computer Program Products

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

2.3 Clouds

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9A, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9A are intended to be illustrative only and that computing nodes 910 and cloud computing environment 950 can communicate with any type of computerized device over any type of network and/or network addressable connection (e.g., using a web browser).

Referring now to FIG. 9B, a set of functional abstraction layers provided by cloud computing environment 50 (FIG. 9A) is shown. It should be understood in advance that the components, layers, and functions shown in FIG. 9B are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and neural network 996.

3.0 General

While the present disclosure has been described with reference to a limited number of embodiments, variants and the accompanying drawings, it will be understood by those skilled in the art that various changes may be made and equivalents may be substituted without departing from the scope of the present disclosure. In particular, a feature (device-like or method-like) recited in a given embodiment, variant or shown in a drawing may be combined with or replace another feature in another embodiment, variant or drawing, without departing from the scope of the present disclosure. Various combinations of the features described in respect of any of the above embodiments or variants may accordingly be contemplated, that remain within the scope of the appended claims. In addition, many minor modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims. In addition, many other variants than explicitly touched above can be contemplated.

What is claimed is:

1. A computer-implemented method of operating a neural network, the method comprising:
training a neural network comprising successive layers, wherein:
the successive layers include an input layer, a hidden layer, and an output layer;
the input layer has n input nodes connected to output nodes of the output layer via the hidden layer;
the hidden layer including m hidden nodes, wherein the neural network is trained through connecting the n input nodes to a subset of k nodes of the m hidden nodes via respective synaptic connections to reduce number of learned parameters during the training, wherein each node in the subset of k nodes is associated with a training weight, which is used to form an n×k input matrix $W_{in}$, wherein the training weights for the m hidden nodes are changeable during the training, and wherein a predetermined subset of m−k nodes of the hidden layer are not connected by any node of the input layer, wherein each node in the m−k nodes is associated with a fixed weight, wherein the fixed weights for the m−k nodes remain unchanged during the training; and
the neural network is set as a feed-forward neural network, the feed-forward neural network including a backpropagation learning algorithm, wherein the backpropagation learning algorithm comprises running the neural network so as to train the training weights of the n×k input matrix Win; and
coupling input data into input nodes of the input layer.

2. The computer-implemented method according to claim 1, further comprising receiving a fixed matrix $W_{rec}$ of the fixed weights.

3. The computer-implemented method according to claim 1, wherein output of the m hidden nodes is a vector.

4. The computer-implemented method according to claim 1, wherein wherein the subset of k nodes are connected by the n input nodes of the input layer.

5. The computer-implemented method according to claim 4, wherein output values y are obtained from input data x.

6. The computer-implemented method according to claim 1, wherein said successive layers comprise several hidden layers, including said hidden layer, each configured as said hidden layer, whereby the input nodes are connected to the output nodes via the several hidden layers.

7. The computer-implemented method according to claim 1, further comprising some of the fixed weights being random.

8. The computer-implemented method according to claim 7, wherein a complementary subset of the fixed weights is random.

9. The computer-implemented method according to claim 7, further comprising an echo state property.

10. The computer-implemented method according to claim 9, wherein said fixed weights comprise a spectral radius that is strictly less than 1.

11. The computer-implemented method according to claim 1, wherein
the neural network is run so as to train the training weights of the n×k input matrix $W_{in}$, in a supervised manner.

12. The computer-implemented method according to claim 1, wherein output values are inferred using a previous training.

13. The method according to claim 1, wherein
said neural network is set as a multilayer perceptron or a convolutional neural network.

14. The method according to claim 1, wherein
said neural network is set as an item-based autoencoder.

15. A computer program product for operating a neural network, the computer program product comprising a computer readable storage medium having program instructions embodied therewith, the program instructions executable by a processor, so as to cause the processor to:
train a neural network comprising successive layers, wherein:
the successive layers include an input layer, a hidden layer, and an output layer;
the input layer has n input nodes connected to output nodes of the output layer via the hidden layer;
the hidden layer including m hidden nodes;
and wherein the neural network is trained through connecting the n input nodes to a subset of k nodes of the m hidden nodes via respective synaptic connections to reduce number of learned parameters during the training, wherein each node in the subset of k nodes is associated with a training weight, which is used to form an n×k input matrix $W_{in}$, wherein the training weights for the m hidden nodes are changeable during the training, and wherein a predetermined subset of m−k nodes of the hidden layer are not connected by any node of the input layer, wherein each node in the m−k nodes is associated with a fixed weight, wherein the fixed weights for the m−k nodes remain unchanged during the training; and the neural network is set as a feed-forward neural network, the feed-forward neural network including a backpropagation learning algorithm, wherein the backpropagation learning algorithm comprises running the neural network so as to train the training weights of the n×k input matrix Win; and
couple input data into input nodes of the input layer.

16. The computer program product of claim 15, wherein input comprises a fixed matrix $W_{rec}$ of the fixed weights.

17. A neural network, comprising a processor operably connected to a memory, the memory containing program instructions to, when executed on the processor:
train a neural network comprising successive layers, wherein:
the successive layers include an input layer, a hidden layer, and an output layer;
the input layer has n input nodes connected to output nodes of the output layer via the hidden layer;
the hidden layer including m hidden nodes;
and wherein the neural network is trained through connecting the n input nodes to a subset of k nodes of the m hidden nodes via respective synaptic connections to reduce number of learned parameters during the training, wherein each node in the subset of k nodes is associated with a training weight, which is used to form an n×k input matrix $W_{in}$, wherein the training weights for the m hidden nodes are changeable during the training, and wherein a predetermined subset of m−k nodes of the hidden layer are not connected by any node of the input layer, wherein each node in the m−k nodes is associated with a fixed weight, wherein the fixed weights for the m−k nodes remain unchanged during the training; and the neural network is set as a feed-forward neural network, the feed-forward neural network including a backpropagation learning algorithm, wherein the backpropagation learning algorithm comprises running the neural network so as to train the training weights of the n×k input matrix Win; and
couple input data into input nodes of the input layer.

18. The neural network of claim 17, wherein the input comprises a fixed matrix $W_{rec}$ of the fixed weights.

19. The computer-implemented method according to claim 1, wherein the backpropagation learning algorithm comprises only modifies the weights of the n×k input matrix $W_{in}$.

20. The computer-implemented method according to claim 1, wherein the backpropagation learning algorithm comprises does not modify the subset of m−k nodes of the hidden layer that are not connected by any node of the input layer.

* * * * *